(No Model.) 2 Sheets—Sheet 2.

H. WYMAN.
MECHANICAL MOVEMENT.

No. 283,451. Patented Aug. 21, 1883.

WITNESSES
A. O. Orne
Fred A. Powell

INVENTOR
Horace Wyman
by Crosby Gregory
Attys.

UNITED STATES PATENT OFFICE.

HORACE WYMAN, OF WORCESTER, MASSACHUSETTS.

MECHANICAL MOVEMENT.

SPECIFICATION forming part of Letters Patent No. 283,451, dated August 21, 1883.

Application filed June 30, 1883. (No model.)

*To all whom it may concern:*

Be it known that I, HORACE WYMAN, of Worcester, in the county of Worcester and State of Massachusetts, have invented an Improvement in Mechanical Movements, of which the following description, in connection with the accompanying drawings, is a specification, like letters on the drawings representing like parts.

This invention is an improvement on United States Patent No. 275,008, granted to me April 3, 1883, and has for its object to simplify the construction of the mechanism therein shown, whereby the auxiliary pattern-surface may be turned by a pawl-and-ratchet contrivance.

Figure 1:
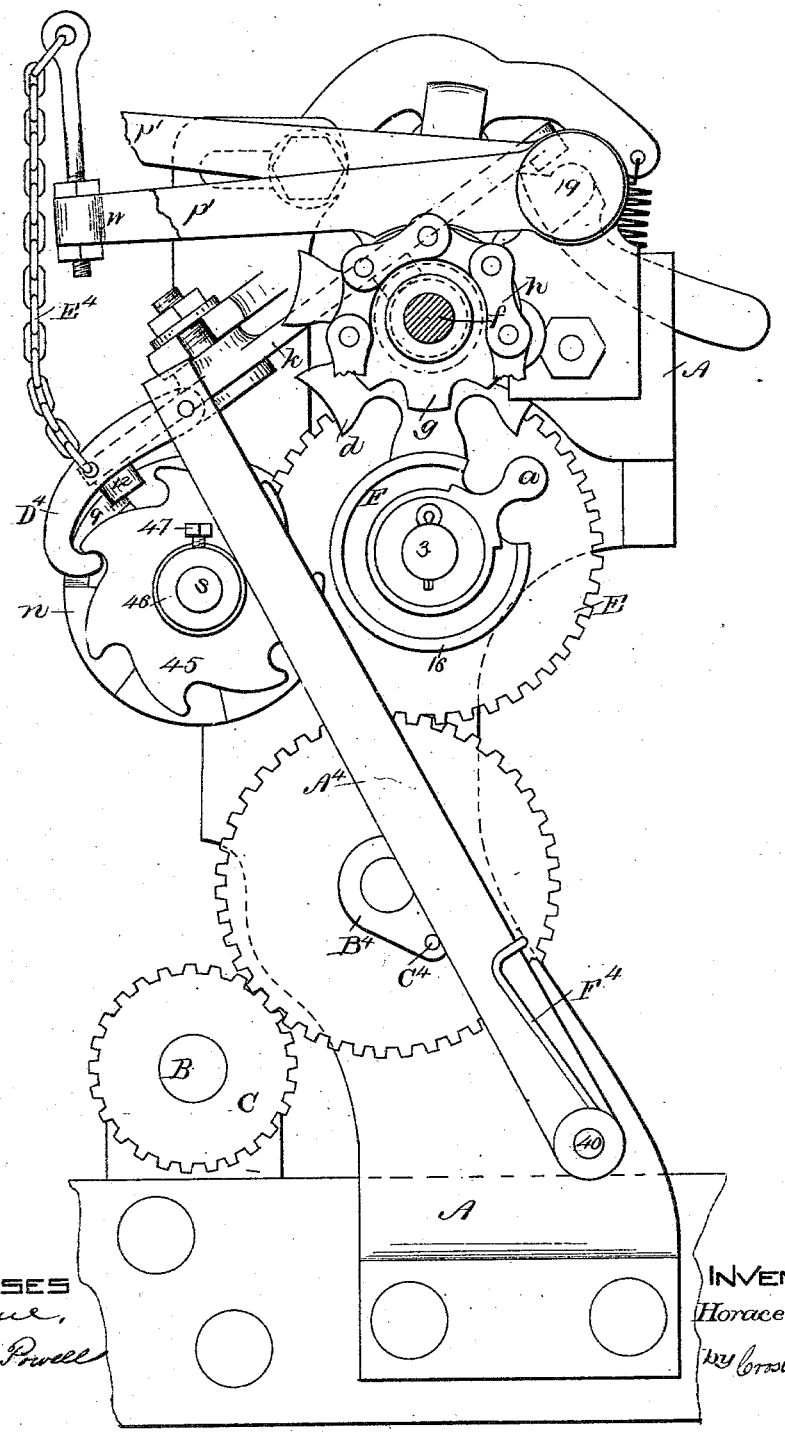
Figure 2:
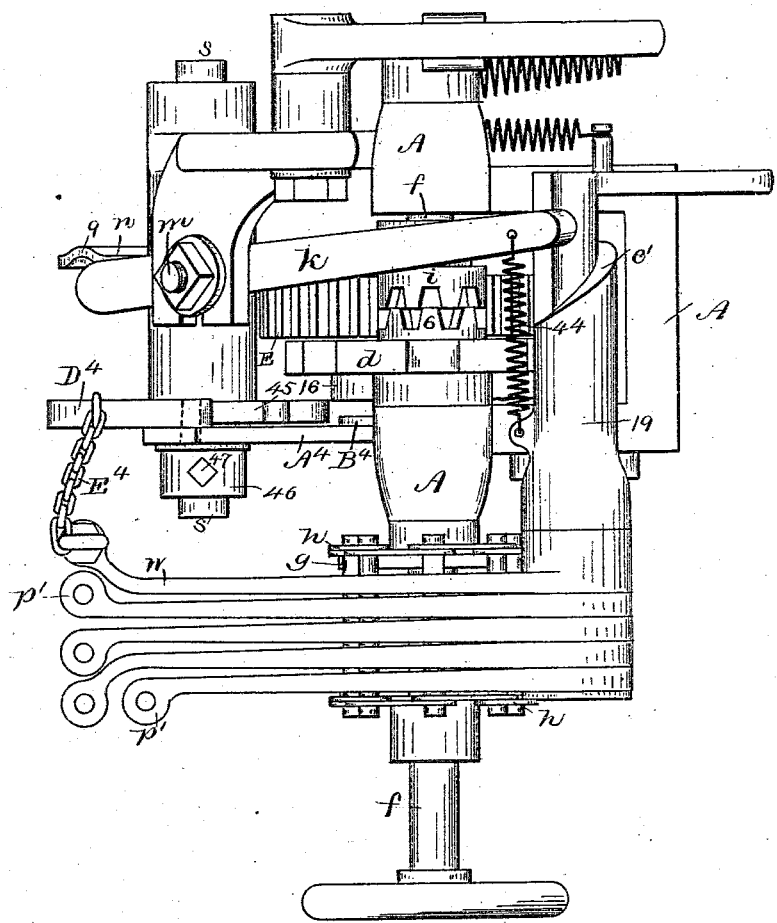

Figure 1 represents a sufficient portion of the apparatus shown in the said patent, together with the novel parts, to be hereinafter described, to enable my present invention to be understood, and Fig. 2 a plan view thereof.

In the accompanying drawings I have used letters and figures of reference the same as those in the patent to designate like parts—as, for instance, A is the frame; B, main shaft; C, pinion; D, intermediate; E, loose gear, having on its hub the pin-wheel F, provided with one pin, $a$, and flange 16; 3, the stud which supports the gear E; $d$, the star-wheel loose on shaft $f$, the latter having fixed to it the notched cylinder or hub $g$ for the pattern-chain $h$. The star-wheel $d$ has a short toothed hub, 6, to be engaged by the teeth of the clutching-hub $i$, splined on the shaft $f$, and having an annular groove to be entered by a pin or roll at the under side of the lever $k$, pivoted at $m$, the said lever having a pin, 12, at its lower end to be acted upon by the auxiliary pattern-surface $n$, loose on the stud $s$. All these parts, so far as mentioned, are the same as in my said patent, except that the notched hub $r$ of the auxiliary pattern-surface $n$ is omitted, and the lever $k$ is prolonged, as will be described, and the said parts co-operate to move the main pattern surface or chain, as in the said patent; but to obviate the employment of the extra star-wheel $e$ and the lever $u$, therein described, and the extra lever $n^2$ and its spring, I have added to the frame a pawl-carrying lever, $A^4$, pivoted at 40 and provided with a pawl, $D^4$, connected by chain or other flexible connection, $E^4$, with the finger $w$, constituting one of a series of fingers marked $p'$ $p'$, which are acted upon by suitable burrs or projections of the pattern-chain, the said pawl-carrier being acted upon by a suitable cam or tappet fixed preferably to the intermediate D; the said tappet being herein shown as on arm $B^4$, provided with a pin, $C^4$, the pawl-carrier being pressed toward the same by a suitable spring, $F^4$.

In my present invention the rocking-shaft 19, also common to the said patent and serving as the fulcrum for the finger $w$ and the fingers $p'$, partially broken off in Fig. 1, has an inclined cam, $e'$, like that shown in the said patent, to act upon the upper end of the lever $k$ and move it to disengage the toothed clutching-hub $i$ from the toothed part of the star-wheel hub 6 when it is desired to move the main pattern-chain on the hub $g$ and the auxiliary pattern-surface $n$ by hand. In the said patent I employed an independent lever for this purpose; but herein I have extended the end of the lever $k$ far enough beyond the pin or roll therein, (see dotted lines, Fig. 1,) which enters the annular groove of the hub $i$, as in said patent, and the extended end of the lever is acted upon directly by the inclined cam $e'$. A spring, 44, connected with the upper end of the said lever, keeps the pin or roller 12 at its lower end against the side of the auxiliary pattern-surface $n$, so that the latter, by its irregular face, will operate the lever one or more times during such rotation and cause it to engage and disengage the parts $i$ and 6 at the desired times, so that the main pattern-chain may be moved for a greater or less number of consecutive steps, or with periods of rest of greater or less duration, notwithstanding the continued rotation of the gear C and intermediate D.

The hub of the auxiliary pattern-surface $n$ has attached to it a ratchet-wheel, 45, and the said pattern-surface and ratchet are prevented from slipping from the stud $s$ by a collar, 46, attached thereto by a set-screw, 47. As herein shown, the auxiliary pattern-surface $n$ has but one depression, 9, and as the lever $k$ is placed the said pattern-surface permits the engagement of the parts $i$ and 6 once during each rotation of and during the time that parts 6 and $i$ are in clutch the hub $g$ and main pattern-surface will be rotated, and if the requirements of the bars and projections of the pattern-chain, governing the position of the finger $w$, are such as to have the main pattern-surface $h$ continue in rotation, the pawl $D^4$ will be kept from engagement with the ratchet 45, and the auxiliary surface $n$ will remain at rest.

The auxiliary pattern-surface will be moved more or less frequently, according to the requirements of the bars and the projections on some of them of the main pattern-surface immediately below the finger $w$; a bar without a roll permitting the pawl $D^4$ to engage the ratchet-wheel, as in Fig. 1, whereas as soon as a roll on a bar meets the said finger it is lifted, removing the pawl from the ratchet 45.

I claim—

1. The main pattern-surface, its shaft, the hub $i$, the toothed hub 6, gearing to move it positively, and the auxiliary pattern-surface, and means to determine the time of the rotation of the main pattern-surface, combined with a ratchet connected with the auxiliary pattern-surface, and with a pawl-carrier, and with means to actuate it, to turn the auxiliary ratchet, and to raise and lower the said pawl to enable it to engage and turn the said ratchet with greater or less frequency, substantially as described.

2. A positively-moved main pattern-surface, with its gearing and with means to move it or leave it at rest, combined with an intermittently-moved auxiliary pattern-surface, its ratchet-wheel and pawl having its movements governed by the main pattern-surface, substantially as described.

3. The positively-moved hub 6 and the pawl $D^4$, combined with the main pattern-cylinder and its connected toothed hub, and the auxiliary pattern-surface and its ratchet-wheel, either of which may be moved by its corresponding hub or pawl, according to the indicators moving with the main pattern-surface, substantially as described.

4. The auxiliary pattern-surface and the main pattern-surface provided with gearing to positively move it, and also provided with a row of indicators or rolls to control the order of movement of the auxiliary pattern-surface, combined with a pawl and ratchet to move the said auxiliary pattern-surface intermittingly, or with periods of rest, according to the demands of the main pattern-surface, whereby the periods of rest of the main pattern-surface are governed, substantially as described.

In testimony whereof I have signed my name to this specification in the presence of two subscribing witnesses.

HORACE WYMAN.

Witnesses:
G. W. GREGORY,
B. J. NOYES.